Aug. 22, 1944.  R. WÖLFLE  2,356,641
BEARING SLEEVE FOR ROTARY SPINDLES IN MACHINE TOOLS
Filed June 13, 1940  2 Sheets-Sheet 1
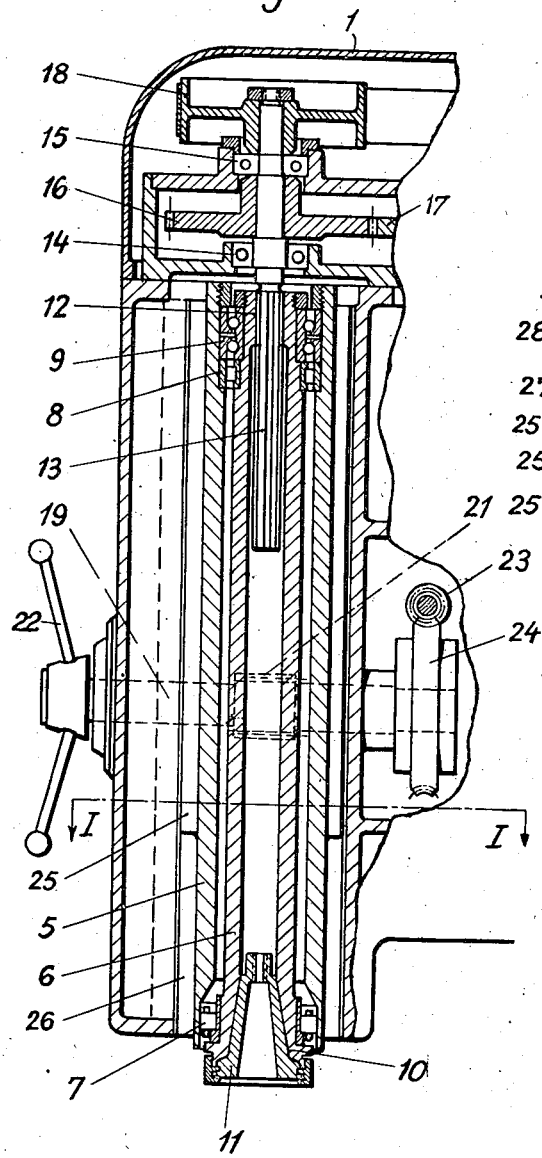
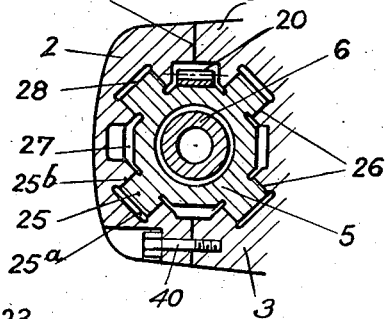
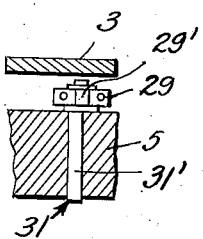
INVENTOR
Robert Wölfle
BY
ATTORNEY Aug. 22, 1944. R. WÖLFLE 2,356,641
BEARING SLEEVE FOR ROTARY SPINDLES IN MACHINE TOOLS
Filed June 13, 1940 2 Sheets-Sheet 2
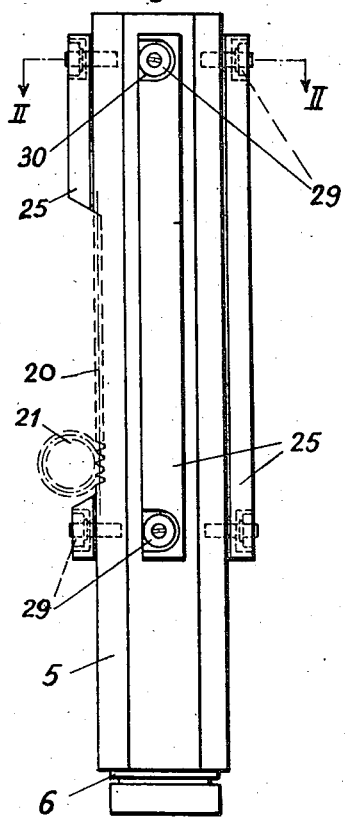
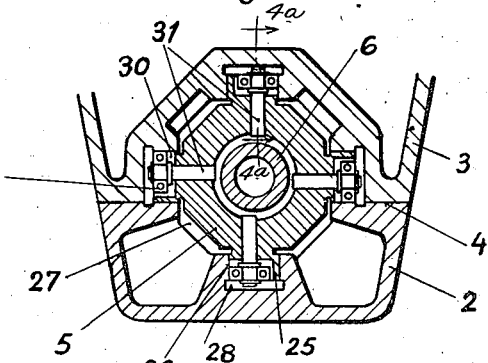
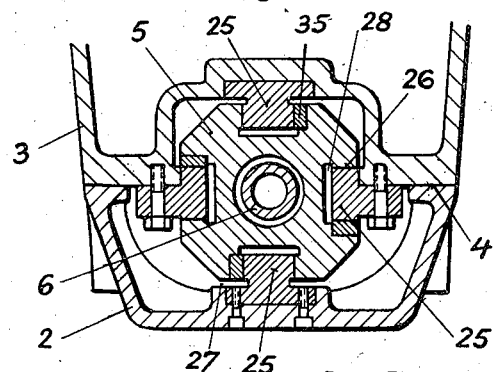
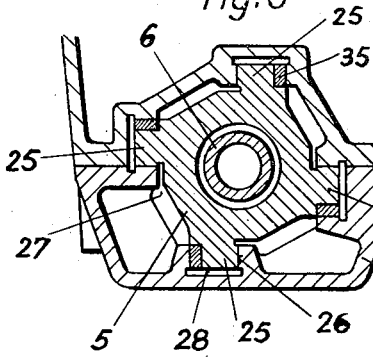
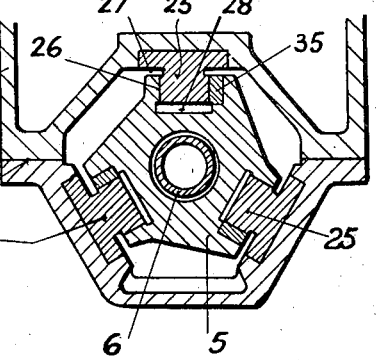
INVENTOR
Robert Wölfle
BY
ATTORNEY Patented Aug. 22, 1944

2,356,641

UNITED STATES PATENT OFFICE 2,356,641

BEARING SLEEVE FOR ROTARY SPINDLES IN MACHINE TOOLS

Robert Wölfle, Berlin-Pankow, Germany; vested in the Alien Property Custodian

Application June 13, 1940, Serial No. 340,300
In Germany June 17, 1939

4 Claims. (Cl. 308—3)

The present invention relates to bearing bushes or sleeves for rotating spindles of machine tools, which can be moved axially, particularly to boring spindle bushings which move longtiudinally in the spindle rod or head stock housing.

The known spindle sleeves in boring or milling machines and the like, which can be moved in the direction of feed, are of circular or prismatic section being guided with extremely little play in a bore hole of suitable diameter of the spindle rod housing.

The spindle resting in the sleeve is moved at variable speed. The speed range of the boring spindle in modern boring machines lies between 50 and 200 R. P. M. in order to permit drilling holes of large and small diameter with the same boring spindle as well as to execute the fine-boring process. When changing the speed, the temperature of the boring spindle bearing will, of course, vary accordingly. If the boring spindle runs without interruption at high speed for a longer time, the spindle sleeve will expand owing to the heat of the bearing, so that it can be moved in the bore hole only with difficulty and even might become locked. On the other hand, it is not advisable to adjust the guide play between the boring spindle sleeve and the bore hole from the start so that even with excessive heat of the bearing the spindle sleeve could yet be easily moved, for in that case the position of the boring spindle axis would become inaccurate owing to the excessive guide play of the bushing when drilling at a slow range of speed with consequent low temperature of the bearings. This condition cannot be allowed, especially with co-ordinate boring machines (jig boring machines).

It is an important object of the present invention to create a spindle sleeve which does not lock in its guide channel owing to heat expansion and does not cause dislocation of the axis of the spindle resting in the sleeve. The instant invention briefly stated consists in that the spindle sleeve in the housing is provided with at least three guide bars or rods which are distributed on the circumference of the sleeve and run parallel to the spindle axis. Each of these guide bars has a parallel pair of guide surfaces and sufficient radial play so as to permit of radial displacement of the said guide surfaces between the spindle sleeve and the housing, owing to heat expansion.

Thus, the expansion of the sleeve caused by the heat from the boring spindle bearings will not affect its guiding control and the spindle sleeve will be guided accurately and easily at any desired rate of speed of the boring spindle.

The invention will be better understood by reference to the following detailed description in connection with the accompanying drawings showing by way of example and purely schematically some embodiments of the invention and in which—

Fig. 1 is a longitudinal section through the boring spindle head of a boring machine.

Fig. 2 is a cross section on line I—I of Fig. 1.

Fig. 3 shows the side view of a spindle sleeve of different type, with the spindle rod housing being removed.

Fig. 4 is a section according to line II—II of Fig. 3, but including the spindle rod housing.

Fig. 4$^a$ is a section taken on the line 4$^a$—4$^a$ in Fig. 4.

Figs. 5, 6 and 7 show horizontal sections of other types of spindle sleeve.

Similar characters of reference denote similar parts in the different figures.

Referring to the drawings, numeral 1 is the head stock or boring spindle rod housing of a boring machine, only partly shown. The head stock 1 consists of the front part 2 and the rear part 3, which are screwed together as indicated at 40. The dividing line is indicated at 4. The hollow boring spindle sleeve 5 in which the boring spindle 6 is mounted to rotate is guided to move longitudinally in the spindle rod housing. The boring spindle bearings consist of the lower roller bearing 7, the upper roller bearing 8 and the roller bearing 9 with shoulders, connected in series. The boring spindle 6 has a cone 10 at its lower end for receiving tools, or an intermediary sleeve 11 to accommodate the tools not shown in the drawings. The upper end of the boring spindle 6 is provided with recesses or grooves 12 engaged by the splined shaft 13 and in this way imparts its rotary motion to the boring spindle. The shaft 13 rests in the sliding bearings 14, 15 in the boring spindle rod and can be selectively driven by the gears 16, 17 or by the pulley 18. The feeding motion is imparted to the boring sleeve 5 by way of the gear pinion 21 and the ratchet 20. The gear 21 is mounted on shaft 19 which may be selectively operated manually, by way of the handwheel 22, or mechanically, by way of the worm gear 23, 24.

The guiding of the boring spindle sleeve 5 consists of several separate longitudinal guides. Fig. 2 shows four such longitudinal guides. Narrow, rectangular guide strips or bars 25 of rectangular cross section arranged radially or star-fashion with respect to the axis of the boring spindle 6 have been provided for this purpose. The guide bars 25 are arranged to form the shape of a cross being set at right angles to each other and are mounted to move along suitable counter-guide surfaces 26 of the spindle rod housing 1. Two of the guide strips 25 are located in the housing part 2 and the remaining two in the housing part 3. Suitable radial play 27 and 28 has been provided between the boring sleeve and the spindle rod housing as well as between the front surface 25a and the guide strip 25 in the housing. It follows that only the lateral surfaces 25b of each guide strip 25 take part in the guiding action and can be influenced by any outside forces. Since none of the portions of the guiding means exerts any radial pressure with regard to the housing, owing to the spaces 27, 28 affording sufficient play, the body of the sleeve can expand uniformly in a radial direction when the bearings become heated. The guides 25, 26 have relatively low lateral guide surfaces 25b, the total of which will amount to only a part of the total of the circumference of the spindle sleeve 5, even if this circumference is assumed to be cylindrical. Consequently, the heat transfer to the boring spindle rod is very small.

The width of the guide strips 25, which means the distance from one lateral guide surface to the other, is likewise comparatively small. The heat expansion of the guide strips perpendicularly to the guide surfaces 26 will therefore be smaller than the guide play allowed for this purpose. Besides, the interstices 27, 28 provide for sufficient heat removal which can still be increased by artificial air draught. It may therefore be said that clogging of the spindle sleeve 5 in its guide channel as well as dislocation of the boring spindle shaft are avoided with absolutely certainty.

Where an especially strong heating of the bearings may be expected owing to the spindle running at high speed, so that also the expansion of the guide strips 25 in perpendicular direction to the guide surfaces 26 should be taken into account, I may provide guide rollers 29 in recesses 30 in each of the four guide surfaces 25, as indicated in Figs. 3 and 4. Said rollers which may be simple ball bearings are mounted on supporting pins 31 fitted in the bushing 5. The shaft 31' of the supporting pin 31 is arranged eccentrically to the shaft 29' of the roller 29 as more clearly shown in Fig. 4a, so that by turning the pin 31 the roller can be adjusted and placed against the guiding surface 26. The wall of the housing has certain apertures, not shown, opposite the rollers, so as to make these accessible from the outside. In this way a combined sliding and guiding control of the rollers is provided. The heat expansion of the guide bar 25, perpendicularly to the guide surface 26, merely causes a resilient action of the free end of the supporting pin 31 so that the boring spindle sleeve 5 can under all circumstances be easily adjusted.

In the embodiment shown in Figs. 1 and 2, the ratchet 20 for feeding the sleeve 5 lies between two guide rods 25. This arrangement is not compulsory and can be changed relative to the position of the ratchet, as shown in Fig. 3. In this modification one of the guide rods has been recessed and the ratchet has been placed into the bottom of the recess. In the embodiment illustrated, the guide rods 25 do not extend over the whole length of the sleeve 5 in the most advanced position. In the case of shorter sleeves the length of the guide rods 25 will be adapted to that of the sleeve.

Fig. 5 shows the same arrangement of the guide rods as in Fig. 4, with the difference, however, that the guide rods 25 are attached to the housing parts 2 and 3 and that the guide surfaces 26 are worked into the sleeve 5. The play of the plane guide surfaces is adjusted by the longitudinal adjustment strips 35.

Fig. 6 shows a design in which only one guide surface of each guide rod 25 lies exactly radially to the axis of the boring spindle.

Fig. 7 shows a design with three single guides. The guide rods 25 have been fastened in the housing, same as in Fig. 5, and the counter-guide surfaces 26 have been provided in recesses in the body of the sleeve 5.

If desired, the guide rods 25 may be formed integral with the body of the sleeve 5, or with the housing 2, 3, respectively (see Figs. 5 and 7). As mentioned before, the housing for the boring spindle sleeve 5 should preferably consist of two parts (front part 2, rear part 3). This has the advantage that the guide surfaces can be machined more easily, also the assembling is thereby facilitated.

All designs illustrated and described above show spindle sleeves having the longitudinal guides 25, 26 uniformly spaced from each other. Certain deviations from this uniform distribution on the circumference of the spindle sleeve can be made in actual practice. Likewise, certain smaller deviations from the symmetrical arrangement of the longitudinal guides with respect to the axis of the cross or, in case of three single guides, Fig. 7, with respect to the radial planes, are permissible.

My novel spindle sleeve is not restricted to the use in boring machines only, but it can be applied in all cases where difficulty with sliding or clogging of the spindle sleeve has been experienced or may be expected owing to the temporarily varied heating of the bearings. The spindle sleeve can be arranged vertically, horizontally or at another angle.

The method and apparatus of the present invention have been described in detail with reference to specific embodiments. It is to be understood, however, that the invention is not limited by such specific reference but is broader in scope and capable of other embodiments than those specifically described and illustrated in the drawings.

I claim:

1. In a machine tool, a bearing sleeve member for a spindle rotatable therein, a stationary member in which said sleeve is movable in an axial direction, at least three guide bars secured to one of said two members and arranged star-fashion around the circumference of the sleeve, said bars projecting towards the other one of said members in a substantially radial direction and extending parallel to the sleeve axis, each bar having two substantially parallel guide faces on its opposite flanks respectively, said other member being provided with flanked recesses to receive therein said bars with their flanks in engagement with the flanks of said recesses, the circumferential surface of said sleeve being radially spaced from said stationary member and the front face of each bar being radially spaced from the bottom of the pertaining recess.

2. In a machine tool, a bearing sleeve member for a spindle rotatable therein, a stationary member in which said sleeve is movable in axial direction, at least three guide bars secured to one of said two members and arranged star-fashion around the circumference of the sleeve, said bars projecting towards the other one of said members in substantially radial direction and extending parallel to the sleeve axis, each bar having two substantially parallel guide faces on its opposite flanks respectively and including a plurality of resiliently mounted rollers constituting one of said guide faces, said other member being provided with flanked recesses to receive therein said bars with said guide faces in engagement with the flanks of said recesses, said sleeve being radially spaced from said stationary member, and the front of each bar being radially spaced from the bottom of the pertaining recess.

3. In a machine tool, a bearing sleeve member a spindle rotatable therein, a stationary member in which said sleeve is movable in axial direction, at least three guide bars secured to one of said two members and arranged star-fashion around the circumference of the sleeve, said bars projecting towards the other one of said members in substantially radial direction and extending parallel to the sleeve axis, each bar having two substantially parallel guide faces on its opposite flanks respectively and including a plurality of rollers constituting one of said guiding faces and being mounted on recesses of the pertaining flank of said bar and means for adjusting the distance said rollers project laterally from such flank, said other member being provided with flanked recesses to receive therein said bars with said guide faces in engagement with the flanks of said recesses, the circumferential surface of said sleeve being radially spaced from said stationary member, and the front of each bar being radially spaced from the bottom of the pertaining recess.

4. A device as claimed in claim 3 wherein each bar further includes, rotatably secured thereto, a pin for each roller and having an eccentric head on which said roller is mounted.

ROBERT WÖLFLE.